UNITED STATES PATENT OFFICE 2,436,645

PRODUCTION OF PYRAN DERIVATIVES

Peter A. Hawkins, Widnes, and Nicholas Bennett, Ditton, England, assignors to Imperial Chemical Industries Limited, a corporation of Great Britain No Drawing. Application November 7, 1944, Serial No. 562,403. In Great Britain November 19, 1943

11 Claims. (Cl. 260—333)

This invention relates to the production of organic compounds and more particularly to the production of pyran derivatives.

According to the present invention 2,3-dihydropyran-5-carboxylic acid and derivatives thereof are prepared by a process which includes the step of reacting dihydropyran with phosgene. Advantageously a considerable excess of phosgene is dissolved in the dihydropyran at temperatures below atmospheric, and the dissolved phosgene is allowed to react with the dihydropyran while the solution is maintained at a temperature not exceeding atmospheric.

The existence of three dihydropyrans can be postulated on purely valence considerations, but so far as we are aware only one has been prepared, namely dihydro-γ-pyran. It is to be understood that references in the present specification and claims to dihydropyran and its derivatives are references to dihydro-γ-pyran and its derivatives.

It appears that by reacting dihydropyran with phosgene reaction occurs according to the following equation:

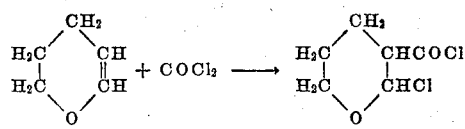

Simultaneously or subsequently with this reaction, however, hydrogen chloride is evolved according to the equation:

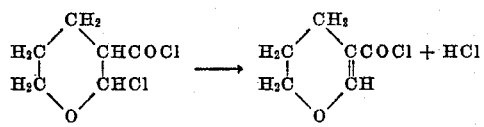

We find that in order to get good yields of the dihydropyran carboxylic acid chloride it is necessary to ensure that the phosgene reacts with the dihydropyran before any substantial amount of hydrogen chloride is evolved, since side reactions otherwise occur leading to the formation of unwanted tar-like or resinous masses. We have further found that this may be achieved by dissolving the phosgene in the dihydropyran at subatmospheric temperatures at which the latter is still liquid and keeping the solution cool while reaction 1 above proceeds. The solution is then warmed so that reaction 2 is initiated.

Thus the 2,3-dihydropyran carboxylic acid can be obtained by dissolving dihydropyran in a solvent, such as carbon tetrachloride, and irradiating it with the light from a mercury arc lamp while gaseous phosgene is gradually introduced at ordinary temperatures, and at such a rate that not more than a small amount of phosgene passes through the liquid unabsorbed. The introduction of phosgene is continued until an amount has been introduced approximately equivalent to the dihydropyran. At this stage the reaction mixture is a brown, viscous liquid or semi-solid mass containing the acid chloride. It is possible to recover acid chloride from this mixture by distillation in high vacuum, but we find that considerable decomposition results, and it is preferable to recover instead the corresponding carboxylic acid by treating the reaction mixture with water to decompose the acid chloride, neutralizing with sodium carbonate so as to dissolve any precipitated acid, filtering, and acidifying it with mineral acid. The acidification with mineral acid causes the dihydropyran carboxylic acid to separate as a crystalline solid which may be filtered off and dried.

In a preferred form of the invention improved yields are obtained by cooling the dihydropyran to a temperature below 15° C. at which it is still liquid, for example between 0° C. and 10° C., and introducing phosgene until between a 50% and 100% excess of phosgene over that required to react with the dihydropyran has dissolved. The solution is then kept cool, for example at a temperature not exceeding atmospheric, for a substantial period of the order of 2 to 3 days. The solution is then allowed to warm up, and the evolution of hydrogen chloride then commences. Heat may then be applied to complete the decomposition of the intermediate chlorotetrahydropyran carboxylic acid chloride, according to Equation 2 above, and the reaction mixture subsequently distilled in vacuo, so that the crude dihydropyran carboxylic acid chloride obtained distils over. This acid chloride may be further purified by distillation, if desired, or it may be used in the production of a variety of derivatives. Thus it may be reacted with water to give a free acid, or it may be reacted with an alcohol or a phenol to give esters. Suitable alcohols with which the acid chloride may be reacted include methyl, ethyl, propyl, and isopropyl alcohols, ethylene glycol, propylene glycol, butylene glycol, diethylene glycol, pentamethylene glycol, glycerol; suitable phenols include phenol, xylenols, and naphthol. Similarly amides may be prepared by reacting the acid chloride with ammonia, methylamines, ethylamines, aniline, substituted anilines, naphthylamines, or substituted naphthylamines. It is also possible to prepare salts of the acid with the corresponding base, and the anhydride of the acid may be obtained by reacting the acid chloride with the free acid, or better, with an alkali metal salt of the acid.

Thus it is within the scope of the invention to prepare compounds of the type

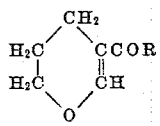

where R is OH, Cl, a monovalent metallic ion, M, $NH_2$, $NHX_1$, $NX_1X_2$, $X_1$ and $X_2$ being the same or different substituted or unsubstituted alkyl, aryl or aralkyl groups, alkyl radicals, such as methyl, ethyl, propyl or isopropyl radicals, aryl radicals such as phenyl, toluyl and naphthyl radicals, aralkyl radicals such as the benzyl radical and such alkyl, aryl, and aralkyl radicals containing substituents such as hydroxyl, amino, nitro and halo groups.

While it is preferred to prepare the dihydropyran carboxylic acid chloride by dissolving gaseous phosgene in pyran, it is also possible to bring about reaction by mixing the dihydropyran with liquid phosgene and maintaining the mixture of liquids at a subatmospheric temperature to allow reaction to proceed. Care should be taken especially when this liquid phase reaction is employed, to avoid the presence in the reaction mixture of small amounts of catalytic material such as iron, which would promote side reactions leading to the formation of tar-like or resinous masses.

The products obtained by this invention are useful as intermediates in the production of dyestuffs and other organic compounds. The esters derived from high molecular weight alcohols may be used as solvents or plasticizers.

The following examples illustrate but do not limit the invention, all parts being parts by weight.

*Example 1*

100 parts of gaseous phosgene were gradually passed into 84 parts of dihydropyran at ordinary temperatures and the solution allowed to stand for 3 days. The reaction mixture was then a thick brown liquid; it was diluted with 100 parts of water, neutralized with sodium carbonate, filtered, and the filtrate rendered slightly acid by the addition of hydrochloric acid. Colorless crystals were thereby precipitated which were washed with cold water and dried. They weighed 34 parts and melted at 72° C. to 74° C.

The crystals, which could be recrystallized from hot water, had an acid value of 132 and had a bromine absorption value of 160. On heating to boiling temperature (230° C.) decomposition occurred with evolution of carbon dioxide and formation of the original dihydropyran.

On treatment with ozone decomposition occurred and substantial amounts of formic acid were identified in the decomposition products. It was thus deduced that the product was 2,3-dihydropyran-5-carboxylic acid. No other isomeric acid would be expected to decompose on treatment with ozone to give formic acid.

*Example 2*

Gaseous phosgene was gradually introduced into 1.0 part of dihydropyran cooled to between 0° C. and 10° C. until 1.65 parts of phosgene had dissolved. The resultant solution was allowed to stand for approximately 64 hours and warm up gradually to atmospheric temperature. The solution was then transferred to a still and heated gradually, when excess phosgene boiled off and hydrogen chloride was evolved. After five hours the product was distilled by increasing the temperature and reducing the pressure in the still to 15 mm. of mercury. The product boiled between 115° C. and 117° C. 1.09 parts of 2,3-dihydropyran-5-carboxylic acid chloride were thus obtained, corresponding to a 62.0% yield.

*Example 3*

1 part of dihydropyran was cooled to 0° C., and gaseous phosgene was passed in until 1.9 parts had dissolved. The reaction mixture was then allowed to stand for 12 hours, the temperature rising gradually within this period to 18° C. The reaction mixture was gradually warmed to 60° C. to remove phosgene still in solution and to cause hydrogen chloride to be evolved, and then gradually up to 110° C. The evolution of hydrogen chloride became copious after the temperature exceeded 95° C. The product in the still was then subjected to distillation at a pressure of 26 mm. of mercury. After an initial low-boiling fraction of 0.02 part had been collected 0.9 part of 2,3-dihydropyran-5-carboxylic acid chloride distilled over between 113° C. and 115° C. The majority of this product distilled over as a colorless liquid which rapidly darkened on standing. The yield of crude 2,3-dihydropyran-5-carboxylic acid chloride was thus 51.3%.

*Example 4*

72 parts of aniline were mixed with a solution of 40 parts of caustic soda in 400 parts of water and 100 parts of dihydropyran carboxylic acid chloride, obtained as in Example 2, were gradually added. The reaction mixture was then heated to about 80° C. for a short time and then allowed to stand. The solid which had separated out was then filtered, washed with water, and crystallised from benzene. The recrystallized 2,3-dihydropyran-5-carboxylic acid anilide thus obtained was in the form of long white odourless needles melting at 118° C. to 119° C. The yield of the product was approximately 42% calculated on the acid chloride.

*Example 5*

40 parts of the dihydropyran carboxylic acid chloride obtained as in Example 2 were added gradually to a mixture of 25 parts of p-toluidine and 20 parts of caustic soda dissolved in 200 parts of water at a temperature of 50° C. When all the acid chloride had been added the temperature was increased to 85° C. for 2 hours to complete the reaction, and the mixture was then allowed to cool while agitating it. A granular solid was thus obtained which was filtered off and after twice recrystallizing from benzene melted at 126° C. A further quantity of crystals was obtained from the mother liquor melting at 125° C. to 126° C., on recrystallization. In all 20 parts of 2,3-dihydropyran-5-carboxylic acid p-toluidide were obtained.

*Example 6*

74 parts of aqueous ammonia (S. G. 0.88) were added to 240 parts of benzene and the mixture was cooled to 3° C. 73 parts of the dihydropyran carboxylic acid chloride obtained as in Example 2 were then added gradually with agitation. The temperature rose to 16° C., and when the addition of the acid chloride was complete the mixture was heated to 70° C. for 2 hours. On cooling, most of the amide crystallized out from the aqueous layer, it was separated and recrystallized from benzene. The 2,3-dihydropyran-5-carboxylic acid amide was thus obtained in the form of white shiny plates melting at 136° C. to 137° C.

Example 7

50 parts of phenol were dissolved in a solution of 40 parts of caustic soda in 400 parts of water, and 73 parts of the acid chloride obtained as in Example 2 were added with agitation at a temperature of 40° C. to 45° C. The temperature was then raised to 65° C. for 1 hour and allowed to cool. The ester layer which separated was removed, and purified by fractional distillation. 40 parts of 2,3-dihydropyran-5-carboxylic acid phenyl ester were obtained boiling at 320° C.

Example 8

30 parts of 2,3-dihydropyran-5-carboxylic acid chloride were added with stirring to 50 parts of water while cooling to keep the temperature below 35° C. Vigorous reaction occurred. After stirring for 1 hour the solid which was precipitated was filtered, washed with a little cold water, and then recrystallized from hot water. 22.8 parts of dihydropyran-5-carboxylic acid were thus obtained in 86% yield melting at 74° C.

Example 9

Sodium 2,3-dihydropyran-5-carboxylic acid was prepared by neutralizing 2,3-dihydropyran-5-carboxylic acid, prepared as in Example 8, with aqueous caustic soda, evaporating the solution to dryness, and grinding the product. 70 parts of the sodium salt so obtained were mixed with 70 parts of the dihydropyran-5-carboxylic acid chloride obtained as in Example 2 and the mixture was heated together under reduced pressure at 110° C. for 3 hours. A small amount of unchanged acid chloride which remained was then distilled off, and the resultant product was extracted with carbon tetrachloride. The carbon tetrachloride was removed from the resultant solution by distillation under reduced pressure. The crystals remaining were filtered off and dried in vacuum. 70 parts of 2,3-dihydropyran-5-carboxylic acid anhydride were thus obtained melting at 90° C.

Example 10

41 parts of the dihydropyran-5-carboxylic acid chloride obtained as in Example 2 were added gradually with stirring to 40 parts of methanol with cooling. After standing for some hours 200 parts of water were added and the mixture was extracted with ether. The extract was washed with aqueous sodium bicarbonate, then with water, and dried over anhydrous calcium chloride. After evaporating off the ether, 38 parts of 2,3-dihydropyran-5-carboxylic acid methyl ester were obtained boiling at 90° C./10 mm. pressure.

By using ethanol in place of methanol, 2,3-dihydropyran-5-carboxylic acid ethyl ester was obtained boiling at 100° C./12 mm. pressure.

Example 11

57 parts of 2,3-dihydropyran-5-carboxylic acid chloride were added gradually to 70 parts of ethylene glycol monoethyl ether with stirring and cooling. After standing for a time 250 parts of water were added which caused an oil to separate which was dissolved in ether. The ethereal extract was washed with bicarbonate solution and then with water, and after drying over anhydrous calcium chloride the ether was evaporated from the solution. On fractional distillation of the residue 55 parts of the ethylene glycol monoethyl ether ester of 2,3-dihydropyran-5-carboxylic acid were obtained boiling at 143° C. to 144° C./11 mm. pressure.

Example 12

100 parts of 2,3-dihydropyran-5-carboxylic acid chloride were added gradually to 35.6 parts of pentamethyleneglycol with stirring and cooling. After stirring for 2 hours water was added and the mixture extracted with ether. The ethereal extract was washed with aqueous sodium bicarbonate and then with water, and dried over anhydrous calcium chloride. On removing the solvent and submitting the remaining material to fractional distillation 79 parts of di-2,3-dihydropyran-5-carboxylic acid pentamethylene glycol ester were obtained, boiling at 240° C. to 242° C./5 mm. pressure.

By using ethylene glycol instead of pentamethylene glycol there was obtained the corresponding ethylene glycol di-ester melting at 92° C., and similarly from diethylene glycol the diethylene glycol di-ester boiling point 250° C. to 256° C./8 mm. pressure.

Example 13

21 parts of 2,3-dihydropyran-5-carboxylic acid chloride obtained as in Example 2 were slowly added to a well cooled agitated mixture of 25 parts of 2-nitro-4-chlorophenol, 12 parts of pyridine, and 150 parts of ethyl ether. The mixture was agitated for a further hour after all of the dihydropyran carboxylic acid chloride had been added, and the pyridine hydrochloride which separated out was then filtered off, washed with water, and the washings mixed with the ethereal solution. The ethereal solution was then separated from the water layer and the ether removed by distillation. 24 parts of a dark red material were obtained which on distillation in vacuum gave a pale green product boiling at 226° C. to 230° C./1 mm. pressure and had a setting point of 58° C. to 59° C.

We claim:

1. A process for the production of a 2,3-dihydropyran-5-carboxylic acid compound which comprises dissolving an excess of gaseous phosgene in dihydropyran at a subatmospheric temperature at which the dihydropyran is liquid, maintaining the resulting solution at a temperature not exceeding atmospheric and thereby causing the phosgene to react with the dihydropyran, and subsequently warming the reaction product so as to cause hydrogen chloride to be evolved.

2. A process for the production of 2,3-dihydropyran-5-carboxylic acid chloride which comprises dissolving an excess of gaseous phosgene in dihydropyran at a subatmospheric temperature at which the dihydropyran is liquid, maintaining the resulting solution at a temperature not exceeding atmospheric and thereby causing the phosgene to react with the dihydropyran, subsequently warming the reaction product so as to cause hydrogen chloride to be evolved, and isolating the resulting 2,3-dihydropyran-5-carboxylic acid chloride by fractional distillation.

3. A process for the production of a 2,3-dihydropyran-5-carboxylic acid compound which comprises passing gaseous phosgene into dihydropyran at a subatmospheric temperature at which the dihydropyran is liquid until between a 40% and 100% excess of phosgene has dissolved over that molecularly equivalent to the dihydropyran, maintaining the resulting solution at a temperature not exceeding atmospheric so as to allow reaction to occur between the phosgene and the dihydropyran, and subsequently warming the reaction product so as to cause hydrogen chloride to be evolved.

4. A process for the production of 2,3-dihydropyran-5-carboxylic acid chloride which comprises passing gaseous phosgene into dihydropyran at a subatmospheric temperature at which the dihydropyran is liquid until between a 40% to 100% excess of phosgene has dissolved over that molecularly equivalent to the dihydropyran, maintaining the resulting solution at a temperature not exceeding atmospheric so as to allow reaction to occur between the phosgene and the dihydropyran, subsequently warming the reaction product so as to cause hydrogen chloride to be evolved, and isolating the resulting 2,3-dihydropyran-5-carboxylic acid chloride by fractional distillation.

5. A process for the production of a 2,3-dihydropyran-5-carboxylic acid compound which comprises dissolving an excess of gaseous phosgene in dihydropyran at a temperature between 0° C. and 10° C., maintaining the resulting solution at a temperature not exceeding atmospheric and thereby causing the phosgene to react with the dihydropyran, and subsequently warming the reaction product so as to cause hydrogen chloride to be evolved.

6. A process for the production of 2,3-dihydropyran-5-carboxylic acid chloride which includes dissolving an excess of gaseous phosgene in dihydropyran at a temperature between 0° C. and 10° C., maintaining the resulting solution at a temperature not exceeding atmospheric and thereby causing the phosgene to react with the dihydropyran, subsequently warming the reaction product so as to cause hydrogen chloride to be evolved, and isolating the resulting 2,3-dihydropyran-5-carboxylic acid chloride by fractional distillation.

7. A process for the production of a 2,3-dihydropyran-5-carboxylic acid compound which comprises passing gaseous phosgene into dihydropyran at a temperature between 0° C. and 10° C. until between a 40% and 100% excess of phosgene has dissolved over that molecularly equivalent to the dihydropyran, maintaining the resulting solution at a temperature not exceeding atmospheric so as to allow reaction to occur between the phosgene and the dihydropyran, and subsequently warming the reaction product so as to cause hydrogen chloride to be evolved.

8. A process for the production of 2,3-dihydropyran-5-carboxylic acid chloride which comprises passing gaseous phosgene into dihydropyran at a temperature between 0° C. and 10° C. until between a 40% and 100% excess of phosgene has dissolved over that molecularly equivalent to the dihydropyran, maintaining the resulting solution at a temperature not exceeding atmospheric so as to allow reaction to occur between the phosgene and the dihydropyran, subsequently warming the reaction product so as to cause hydrogen chloride to be evolved, and isolating the resulting 2,3-dihydropyran-5-carboxylic acid chloride by fractional distillation.

9. 2,3-dihydropyran-5-carboxylic acid chloride.

10. A process for the production of 2,3-dihydropyran-5-carboxylic acid which comprises dissolving an excess of gaseous phosgene in dihydropyran at a subatmospheric temperature at which the dihydropyran is liquid, maintaining the resulting solution at a temperature not exceeding atmospheric and thereby causing the phosgene to react with the dihydropyran, and subsequently warming the reaction product so as to cause hydrogen chloride to be evolved and treating the resulting reaction product with water.

11. A process for the production of esters of 2,3-dihydropyran-5-carboxylic acid which comprises dissolving an excess of gaseous phosgene in dihydropyran at a subatmospheric temperature at which the dihydropyran is liquid, maintaining the resulting solution at a temperature not exceeding atmospheric and thereby causing the phosgene to react with the dihydropyran, and subsequently warming the reaction product so as to cause hydrogen chloride to be evolved isolating the resulting acid chloride from the reaction mixture and reacting said acid chloride with a compound from the group consisting of alcohols and phenols.

PETER A. HAWKINS.
NICHOLAS BENNETT.

REFERENCES CITED

The following references are of record in the file of this patent:

Meyer-Synthese der Kohlenstoff-Verbindungen Zweiter Teil-Heterocyclen, 1st half., pp. 315, 322, 323. (Copy in Div. 59.)

Journal Chem. Society, 1930, p. 2525. (Copy in Scientific Library.)